US008674307B2

(12) United States Patent
Dupont et al.

(10) Patent No.: US 8,674,307 B2
(45) Date of Patent: Mar. 18, 2014

(54) SYSTEM AND METHOD FOR DETECTING INFRARED RADIATION

(75) Inventors: Benoît Dupont, Brussels (BE); Michel Vilain, Saint-Georges de Commiers (FR)

(73) Assignee: Ulis, Veurey Voroize (FR)

(*) Notice: Subject to any disclaimer, the term of this patent is extended or adjusted under 35 U.S.C. 154(b) by 66 days.

(21) Appl. No.: 13/277,661

(22) Filed: Oct. 20, 2011

(65) Prior Publication Data

US 2012/0037805 A1    Feb. 16, 2012

Related U.S. Application Data

(63) Continuation of application No. PCT/FR2010/050746, filed on Apr. 19, 2010.

(30) Foreign Application Priority Data

Apr. 30, 2009   (FR) .................................... 09 52919

(51) Int. Cl.
*G01J 5/24* (2006.01)
(52) U.S. Cl.
USPC .......................................... 250/349; 250/352
(58) Field of Classification Search
USPC ................................................ 250/348, 352
See application file for complete search history.

(56) References Cited

U.S. PATENT DOCUMENTS

| 5,756,999 | A | 5/1998 | Parrish et al. |
| 2002/0022938 | A1 | 2/2002 | Butler |
| 2006/0231760 | A1 | 10/2006 | Lee et al. |

FOREIGN PATENT DOCUMENTS

WO    98/47102 A2    10/1998

OTHER PUBLICATIONS

Sedky et al. Thermally insulated structures for IR bolometers, made of polycrystalline silicon germanium alloys, 1997 International Conference on Solid-State Sensors and Actuators (Jun. 1997), pp. 237-240.*
Dem'yanenko et al. Using bias pulses to equalize the signals in microbolometer detector arrays, Journal of Optical Technology vol. 75, No. 2 (Feb. 2008), pp. 114-119.*
Eric Mottin, et al., "*Uncooled Amorphous Silicon Technology Enhancement for 25-μm Pixel Pitch Achievement*," Infrared Technology and Applications XXVIII, Proceedings SPIE, vol. 4820, 200 (2003) *Abstract*.

* cited by examiner

*Primary Examiner* — David Porta
*Assistant Examiner* — Shun Lee
(74) *Attorney, Agent, or Firm* — Burr & Brown, PLLC (57) ABSTRACT

A device for detecting infrared radiation comprising an array of bolometers for detecting radiation; and in order to read each bolometer, a signal shaping circuitry comprising: a circuitry capable of biasing the bolometer at a predetermined voltage in order to make current flow therethrough; a circuitry capable of generating a common-mode current; and a circuitry capable of integrating the difference between the current that flows through the bolometer and the common-mode current. According to the invention, the device comprises a circuitry capable of injecting current into each bolometer in order to shift its resistance by a predetermined quantity that depends on its offset, current injection being performed prior to readout biasing of the bolometer and the shift being performed according to the direction in which the bolometer's resistance varies as a function of temperature. In addition, correction circuitry is capable of shifting the resistances of bolometers towards a common value.

3 Claims, 7 Drawing Sheets

Fig. 1

Prior Art

SYSTEM AND METHOD FOR DETECTING INFRARED RADIATION

FIELD OF THE INVENTION

The present invention relates to the field of infrared imaging and pyrometry using bolometers. More especially, the invention relates to the field of image sensors for bolometric detection, regardless of the detection band and the type of bolometric materials used.

BACKGROUND OF THE INVENTION

Detectors designed for infrared imaging are conventionally produced as a one or two-dimensional array of elementary detectors, or bolometers, said bolometers taking the form of membranes suspended above a substrate which is generally made of silicon, by means of support arms that have a high thermal resistance.

The substrate usually incorporates means of sequentially addressing the elementary detectors and means of electrically exciting and pre-processing the electrical signals generated by these bolometers. This substrate and the integrated means are commonly referred to as the "readout circuit".

In order to obtain a scene infrared image using this detector, the scene is projected through suitable optics onto the array of bolometers and clocked electrical stimuli are applied via the readout circuit to each of the bolometers or to each row of such bolometers in order to obtain an electrical signal that constitutes an image of the temperature reached by each of said elementary detectors. This signal is then processed to a greater or lesser extent by the readout circuit and then, if applicable, by an electronic device outside the package in order to generate a thermal image of the observed scene.

This type of detector has numerous advantages in terms of its manufacturing cost and implementation but also has drawbacks that limit the performance of systems that use such detectors. In particular, there are problems with regard to the uniformity of the image obtained. In fact, when exposed to a uniform scene, not all the bolometers respond in exactly the same way and this results in fixed spatial noise in the image thus obtained.

This variability has several sources. In particular, technological variability of the resistance of the bolometers causes, among other defects, offset variation and gain variation in the image, i.e. in the case of offset, spatial variation in the output levels of bolometers exposed to a uniform image and, in the case of gain, variability of the absolute variation in the output levels of bolometers that are exposed to a uniform temperature variation of a scene.

There are numerous offset correction methods. A first method for correcting offset variation involves using offset correction tables which are prepared after factory calibration operations. However, the stability of these corrections depends on the temperature stability of the focal plane and thus, in non-temperature controlled applications (commonly referred to as "TEC-less"), it is necessary to resort to acquiring and storing gain and offset tables for multiple, so-called calibration temperatures and then using said tables when the detector is operated, for instance by interpolation, in order to ensure continuous digital correction over the entire operational dynamic range, in terms of temperature, of the focal plane of the detector. These tables, obtained using a factory calibration test bench, incur significant costs for manufacturers, especially in terms of the equipment that is installed in the calibration test bench and the time it takes to acquire all the gain and offset tables.

Another method, disclosed for example in Document US 2002/0022938, involves acquiring an image of a uniform reference scene by closing a mechanical shutter. Once this image has been acquired, the shutter is opened and the reference image is stored and then digitally or analogically subtracted from the current images. This method is more widely known as "shutter correction" or "one-point correction". It has the advantage of enabling highly efficient correction at around the ambient temperature of the detector which was used to acquire the reference image and requires little memory and few computing resources.

On the other hand, this method involves using a mechanical shutter—a mechanical device which has a non-negligible cost, is relatively fragile because of the moving parts it contains and consumes energy. What is more, if operating conditions change and, more especially the thermal environment of the detector changes, the images acquired from the scene deteriorate due to the reappearance of offset variation and it is then necessary to acquire a reference image again by closing the mechanical shutter. In fact, the detector is unusable, at least for the time it takes to acquire the reference image.

Another offset correction method which is disclosed, for example, in document WO 98/47102, involves digitally processing a series of consecutive images contained in a rolling time window that includes enough frames to make it possible to extract a continuous component from the time window. The spatial distribution of this continuous component, which is similar to the offset distribution, is then digitally subtracted from the current acquired images.

However, this not only suppresses the actual offset variation itself, it also suppresses all the static information from the scene. There is admittedly no need to use a mechanical shutter but offset correction like this is only really acceptable in cases where the scene is essentially permanently variable or moving. In fact, all details and fixed local contrasts over a duration that is equal to or greater than the duration of the rolling window are processed as non-uniformities and, by virtue of this, are corrected in the same way as fixed spatial noise.

Generally speaking, offset correction methods according to the prior art are only applied once an image has been acquired and therefore correct the effects of offset variation in the image. Nevertheless, although offset variation impacts image quality as such due to the presence of noise that is independent of the scene, it also has effects on the dynamic range of the observable scene that these types of techniques do not correct.

Figure 1:
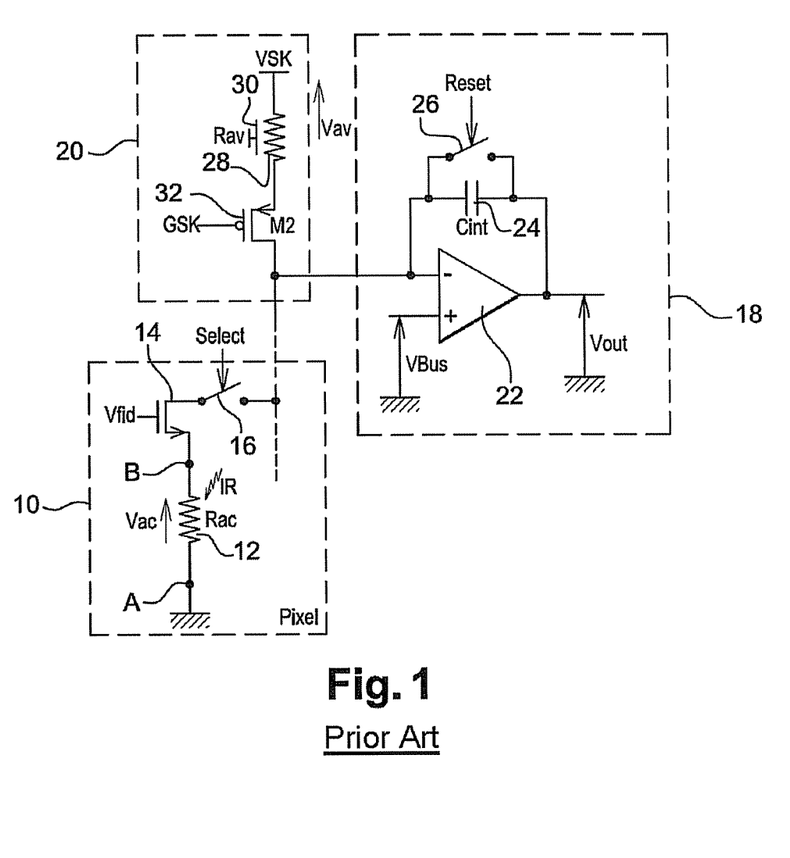
FIG. 1 is a schematic view of a basic detection and readout layout of the kind that is conventionally used in bolometric array detectors. This layout has already been described above.

To correct this phenomenon, FIG. 1 shows a basic detection and readout layout of the kind that is conventionally used in bolometric array detectors.

This basic layout comprises:
- a picture element, or pixel, 10, comprising, in particular, an imaging bolometer 12 and components 14 and 16 that are needed in order to implement it;
- an integrating circuit 18 used to read imaging bolometer 12; and
- a compensation circuit 20 for compensating a common-mode current that flows through imaging bolometer 12 when the latter is read.

Bolometer 12 is subjected to infrared radiation IR originating from a scene and is connected to ground by a first terminal A.

Integrating circuit 18 comprises:
- an operational amplifier 22, the non-inverting input (+) of which is kept at a predetermined constant voltage VBUS;

a capacitor 24, having a predetermined capacitance $C_{int}$ and connected between the inverting input (−) of amplifier 22 and the output of the latter; and a reset switch 26 connected in parallel with capacitor 24 and controllable by means of a "Reset" signal.

Picture element 10 also comprises a read switch 16 that can be controlled by means of a "Select" signal and is connected to the inverting input (−) of the operational amplifier and a first MOS injection transistor 14, the gate of which is controlled by a voltage VFID so as to impose a voltage Vac across the terminals of bolometer 12, the source of which is connected to a second terminal B of bolometer 12 and the drain of which is connected to the other terminal of read switch 16.

Compensation circuit 20 used to compensate the common-mode current that flows through imaging bolometer 12 comprises a resistive compensation bolometer 28 made of the same material as imaging bolometer 12. Compensation bolometer 28 is essentially insensitive to radiation originating from the scene, for instance because it has a low thermal resistance relative to the substrate and is, optionally or alternatively, provided with an opaque shield 30.

One of the terminals of compensation bolometer 28 is connected to a predetermined voltage VSK and its other terminal is connected to the source of a second MOS injection transistor 32 of circuit 20. The drain of injection transistor 32 is connected to the inverting input (−) of operational amplifier 22 and its gate is connected to a predetermined voltage GSK.

In order to read bolometer 12, once capacitor 24 has discharged due to zero reset switch 26 closing, imaging and compensation bolometers 12, 28 are biased by the control voltage of biasing transistors 14, 32 and the difference between current Iac that flows through imaging bolometers 12 and current Iav that flows through compensation bolometer 28 is integrated by integrating circuit 18 over a predetermined integration duration Tint. As is known in itself, the use of compensation circuit 20 is justified by the fact that the useful current, i.e. that which is representative of the temperature of the scene, only accounts for a minute portion, generally around 1%, of the total current that flows through imaging bolometer 12, hence the need to eliminate the common-mode current before integration.

The voltage Vout on the output of integrator 18 is then given by the equation:

$$Vout = VBUS + \frac{1}{C_{int}} \int_0^{Tint} (Iac(t) - Iav(t)) dt \quad (1)$$

Integration by circuit 18 thus makes it possible to apply, through the value of capacitance $C_{int}$, gain to readout of the wanted signal whilst ensuring conversion of the useful current to a voltage that is simpler to manipulate. This way, all the imaging bolometers of the array detector are read in the same way, especially by applying the same bias level.

The layout and operation of the components described above is conventional and is not explained in any greater detail for the sake of brevity. For additional details, the reader is advised to consult, for example, the document entitled "*Uncooled amorphous silicon enhancement for 25 µm pixel pitch achievement*" by E. Mottin et al, Infrared Technology and Application XXVIII, SPIE, vol. 4820.

Assuming, for instance, that the relative spatial variation in the resistance of the imaging bolometers of the detector equals 1%, resulting in, for low bias levels, a 1% variation in currents Iac, and that biasing of the compensation bolometers is selected so that current Iav equals approximately 90% of current Iac, the spatial variation in voltages Vout after all the bolometers have been read is approximately 10%. In conventional detectors, this variation represents around 300 mV of their dynamic output response. If biasing of the imaging bolometers is also increased, for instance by 50%, in order to increase the value of the output levels and hence the sensitivity of the detector, the variation in output voltages Vout also increases by 50% and then reaches 450 mV. Considering that the total dynamic response available is usually limited to 2 or 3 V, a significant portion of this dynamic response is therefore used up by the natural variability of bolometers alone.

Thus, offset variation, simply by existing, uses up a portion of the dynamic output response of a detector. The term "residual dynamic response" or "dynamic scene response" is usually used to denote the difference between the maximum amplitude of voltage Vout when the integrating circuits are not saturated and the maximum amplitude of output voltages Vout when exposed to a uniform scene, i.e. the remaining dynamic response to the wanted signal.

Besides the residual dynamic response being less than the electrical dynamic response of the integrating circuits simply due to the presence of offset variation, this residual dynamic response diminishes as the sensitivity desired by the user increases.

Also, when the imaging bolometers are biased, their temperature rises due to the Joule effect, resulting in increased amplification of variation in the currents that flow through them and hence the output voltages, thus resulting in a reduced residual dynamic response. A similar phenomenon also occurs when the temperature of the focal plane on which the bolometer array is positioned is increased. Because usual bolometric materials have a negative coefficient of thermal resistance, this results in variability of the output levels of the bolometers increasing rapidly, thereby significantly diminishing the residual dynamic response.

It should be noted that offset variation corrections according to the prior art do not deal with this reduction in residual dynamic response in any way and confine themselves to retrospectively correcting the effects of said variability on images that have already been formed.

SUMMARY OF THE INVENTION

The object of the present invention is to propose a method and a bolometric detection device that correct the effect of offset variability both on formed images and on residual dynamic response.

The object of the invention is a device for detecting infrared radiation comprising:

an array of bolometers for detecting said radiation; and a signal shaping circuitry for reading each bolometer comprising:

a readout biasing circuitry capable of biasing the bolometer at a predetermined voltage in order to make current flow through the latter;

a common-mode rejection circuitry capable of generating a common-mode current; and an integrating circuitry capable of integrating the difference between the current that flows through the bolometer and the common-mode current.

According to the invention, the system comprises circuitry for correcting the resistance of the bolometers which is capable of injecting current into each bolometer in order to shift its resistance by a predetermined quantity that depends on its offset, current injection being performed prior to readout biasing of the bolometer and the shift being performed according to the direction in which the bolometer's resistance varies as a function of temperature.

In other words, the circuit that controls the resistance of the bolometers according to the invention individually modifies the value of the resistances of the bolometers so as to reduce this resistance if the resistance of the bolometer diminishes as a function of temperature or increase it if the opposite applies. The resistances of the bolometers are preferably modified in a way that makes them substantially identical. This correction is performed upstream from reading, i.e. before the bolometers are biased and the currents are integrated. This modification of resistances is obtained through the Joule effect by using electrical means in a phase prior to the integration phase without altering the thermal information obtained from the observed scene.

According to particular embodiments of the invention, the device comprises one or more of the following aspects.

The correction circuitry is capable of shifting the resistances of the bolometers towards a common value.

The correction circuitry comprises timing means capable of stopping current injection after a duration that is determined as a function of the offset dependent quantity.

The bolometer comprises a bolometric membrane of the semiconductor type suspended above a substrate and timing means (142) is capable of stopping current injection after a period according to the equation:

$$t(i, j) = \frac{k \cdot TPF^2 \cdot C_{th}}{E_A \cdot V_{ac}^2} \cdot \Delta R_0(i, j)$$

where $t(i, j)$ is the predetermined duration, $\Delta R_0(i, j)$ is a quantity that depends on the offset, k is Boltzmann's constant, TPF is the temperature of the substrate, $C_{th}$ is the heat capacity of the bolometer, $E_A$ is the thermal conduction activation energy of the bolometric material of which the bolometer is made and $V_{ac}$ is the voltage across the terminals of the bolometer.

The correction circuitry comprises the following in order to inject current into the bolometer:
  a constant current source;
  a first controllable switch capable of connecting and disconnecting the constant current source to or from the bolometer; and
  a circuit that compares the voltage across the terminals of the bolometer with a first predetermined voltage that depends on the offset.

The comparison circuit comprises:
  an operational amplifier mounted as a voltage follower with its non-inverting input connected to the bolometer;
  a capacitor connected by its first terminal to the output of the operational amplifier;
  a comparator connected by its non-inverting input to the second terminal of the capacitor, with the output of the comparator controlling opening and closing of the first controllable switch and the inverting input of the comparator receiving the first predetermined voltage; and
  a second controllable switch connected between the second terminal of the capacitor and a second predetermined voltage.

The first and the second predetermined voltages satisfy the following equation:

$$V_{ref}(i,j) = V_{clamp} - Iref \cdot \Delta R_0(i,j)$$

where $V_{ref}(i,j)$ is the first voltage, $V_{clamp}$ is the second voltage, Iref is the constant current output by the constant current source and $\Delta R_0(i, j)$ is the predetermined quantity that depends on the bolometer's offset.

The correction circuitry is capable of injecting a current into the bolometer having a value that depends on the predetermined quantity which depends on the bolometer's offset.

The value of the current satisfies the following equation:

$$Iref(i, j) = \sqrt{\frac{k \cdot TPF^2}{E_A \cdot R_{ac}(i, j) \cdot \Delta t} \cdot C_{th} \cdot \Delta R_0(i, j)}$$

where $Iref(i,j)$ is the value of the current, $\Delta R_0(i, j)$ is the value that depends on the offset, k is Boltzmann's constant, TPF is the temperature of the substrate, $C_{th}$ is the heat capacity of the bolometer, $E_A$ is the thermal conduction activation energy of the bolometric material of which the bolometer is made, $R_{ac}(i,j)$ is the resistance of the bolometer and $\Delta t$ is the time for which the current is applied.

The circuitry that controls the resistance of the bolometers is capable of temporarily deferring the injection of current into the bolometers of a predetermined set of bolometers so as to terminate said current injection substantially simultaneously.

The array of bolometers is read one row at a time and the resistance control circuitry is located at the end of each column of the array of bolometers and is capable of being connected to every bolometer in the column in order to control each bolometer's resistance.

The invention thus makes it possible to increase the sensitivity of the detector by increasing its residual dynamic response and therefore reducing the extent of variability of the offsets in the formed images and/or to use the device at higher temperatures. More generally, the product of sensitivity times residual dynamic response is substantially increased.

The object of the invention is also a method for detecting infrared radiation by using an array of bolometers, this method consisting of the following steps in order to read a bolometer:
  biasing the bolometer at a predetermined voltage in order to make current flow through the latter;
  subtracting a common-mode current from the current that flows through the bolometer; and
  integrating the difference between the current that flows through the bolometer and the common-mode current.

According to the invention, the method involves, prior to reading the bolometer, injecting a current into the bolometer so as to shift the bolometer's resistance by a predetermined quantity that depends on the latter's offset according to the direction in which the resistance of the bolometer varies as a function of temperature.

In one particular embodiment of the invention, the predetermined values that depend on the offsets associated with the bolometers are determined by:
  exposing the array to a uniform scene;
  determining the corresponding resistances of the bolometers; and
  subtracting the following from said resistances:
    a quantity substantially equal to the smallest of the determined resistances in the case of bolometers that have a negative resistance coefficient; or
    subtracting, from said resistances, a quantity substantially equal to the largest of the determined resistances in the case of bolometers that have a negative resistance coefficient.

BRIEF DESCRIPTION OF THE DRAWINGS

The invention will be made more readily understandable by the following description which is given merely by way of example and relates to the accompanying drawings in which identical references denote identical or analogous components and in which.

DETAILED DESCRIPTION OF THE INVENTION

Figure 2:
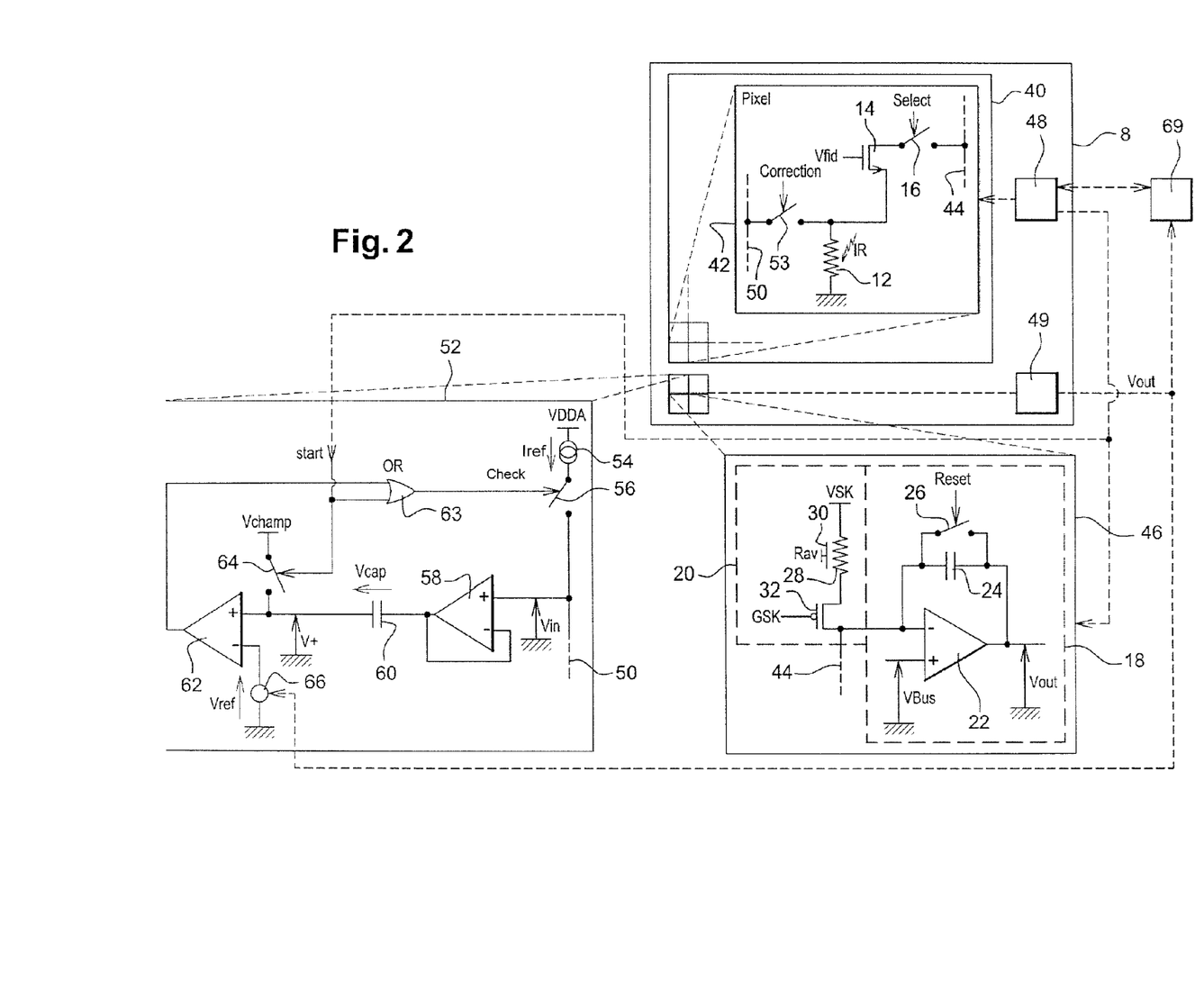
FIG. 2 is a schematic view of a first embodiment of a bolometric array detection device in accordance with the invention.

A bolometric detector according to the invention is shown schematically in FIG. 2. This detector comprises an array 40 of unitary detection elements 42, or "pixels", having N rows and M columns with each of the pixels comprising an imaging bolometer 12, a MOS transistor 14 and a read switch 16.

Each column of array 40 is associated, via a column read bus 44, with readout circuitry 46 which comprises an integrator 18, formed by an operational amplifier 22, capacitor 24 and zero reset switch 26, as well as a compensation circuit 20, formed by a resistive compensation bolometer 28 which is substantially insensitive to the radiation, for example by heat sinking to the substrate and/or by means of an opaque shield 30, and a MOS injection transistor 32.

Each pixel 42 of array 40 forms, together with its associated readout circuitry 46, a basic layout similar to that described in relation to FIG. 1. All the bolometric elements 12, 28 are formed on the surface of substrate in which all the electronic elements are formed. The optically active area 40 is placed at the focus of appropriate optics (not shown).

As is known in itself, bolometers 12 of array 40 are read row by row, with the row of pixels that is currently being read being connected to readout circuitries 46 by closing read switches 16. As is usual in this process, after establishing voltages Vout on the output of integrators 18 at the end of reading a row, signals Vout are sampled and held before addressing the next row and then multiplexed to output amplifier 49; readout is usually clocked by a timer circuit 48 that is provided in substrate and tasked with opening and closing read switches 16 and zero reset switches 26. The reader should refer, for instance, to the article mentioned above for more details of how readout operates.

According to the invention, each column of array 40 is also associated, via a column correction bus 50, with circuitry 52 for controlling the resistance of the bolometers in said column. The function of circuitry 52 is to correct the effect of the offset variability of bolometers 12 on the formed images as well as the effect of this variability on the detector's residual dynamic response. Connecting and disconnecting a pixel 42 in a column to its control circuitry 52 is ensured by a correction switch 53 located in pixel 42 between correction bus 50 and bolometer 12 and driven by timer circuitry 48 in a manner that is described in detail below.

Control circuitry 52 comprises:

- a current source 54 that outputs a constant predetermined current Iref and has one of its terminals connected to a constant voltage source VDDA;
- a first controllable switch 56 connected between the other terminal of current source 54 and column correction bus 50;
- an operational amplifier 58 whose non-inverting input (+) is connected to column correction bus 50. The inverting input (−) of amplifier 58 is connected to the latter's output so that amplifier 58 thus operates as a voltage follower;
- a capacitor 60 that has one of its terminals connected to the output of amplifier 58;
- a comparator 62, the positive input (+) of which is connected to the other terminal of capacitor 60 and the output of which controls opening and closing of switch 56 through an OR logic gate 63;
- a second switch 64 that can be controlled by means of a "Start" signal by timer circuitry 48; and
- a voltage source 66 connected to the negative input (−) of comparator 62 and producing, on the latter, a reference voltage Vref whose value depends on the imaging bolometer 12 of pixel 42 to which control circuitry 52 is connected.

As explained in detail later on, the voltage produced by voltage source 66 is programmable in order to allow adaptation to suit the pixel to which control circuitry 52 is connected. This voltage source comprises, for instance, a digital-to-analogue converter fed by a table of digital values stored in the detector.

Finally, the detector according to the invention comprises a correction management unit 69 that is typically (but not necessarily) not located on substrate 10. Management unit 69 stores, in particular, correction parameters for the resistances of imaging bolometers 12 and implements calibration of said parameters, as explained in greater detail below.

Unit 69 is, for instance, a digital processing unit as classically provided in detectors according to the prior art. The detectors are actually provided, firstly, with a digital output (analogue-to-digital conversion (ADC)) for signals Vout formed in substrate 8 behind amplifier 49 or remoted in external electronic components and are, secondly, associated with a digital processing unit which comprises memories and correction algorithms, for example offset and gain algorithms for traditional "2-point corrections" that are needed for ordinary use of the detector. Said digital processing unit is deemed, hereinafter, to comprise, as is customary in this field, said means of storage and means of processing the digital data stated above in order to implement the invention.

Figure 3:
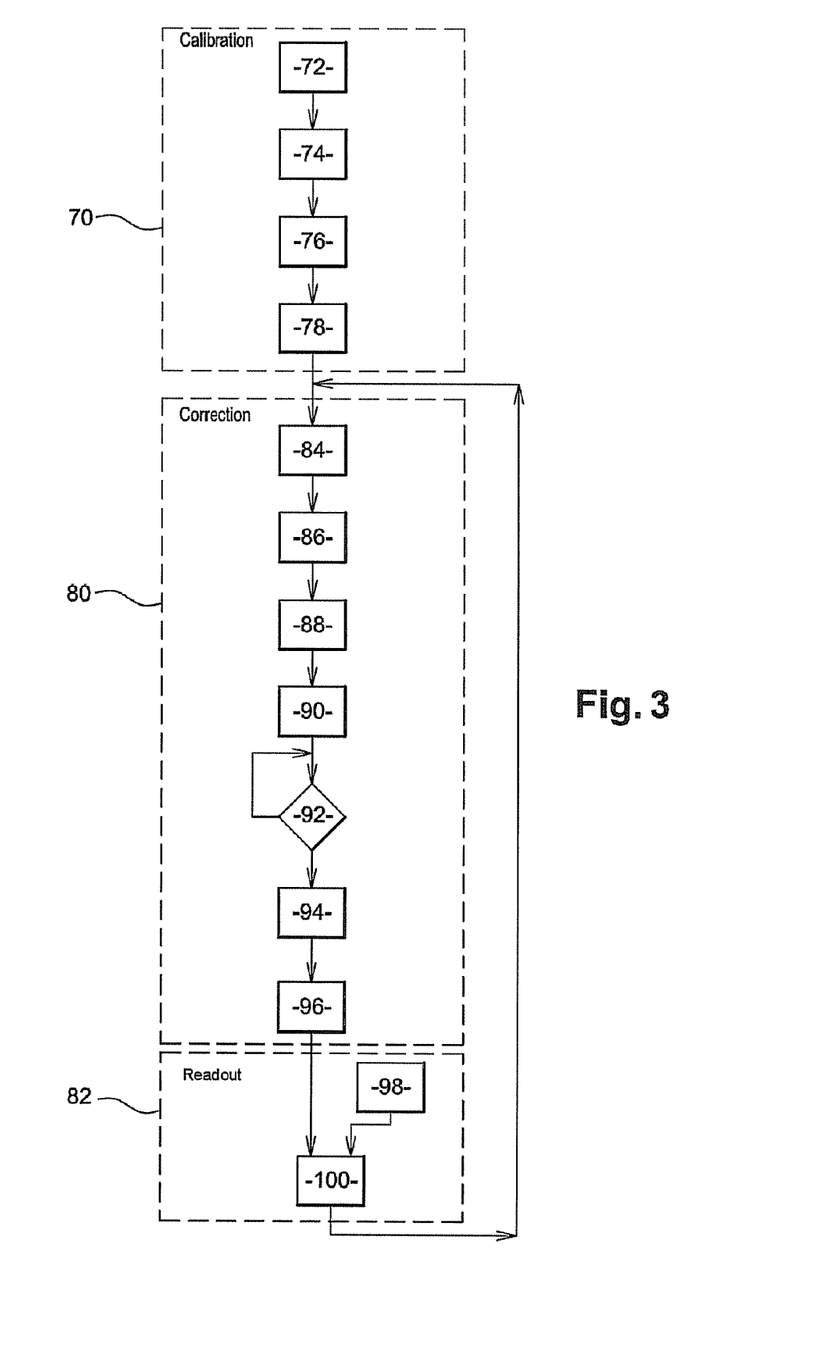
FIG. 3 is a flowchart showing a method for correcting variability in the offset of bolometers in accordance with the invention.

A method for correcting the effects of offsets as used by the detector described above is described below in relation to the flowchart shown in FIG. 3. This method is based on the rapid variation that the resistances of bolometers exhibit when a current flows through them (self-heating phenomenon due to the Joule effect). A current is thus injected into imaging bolometers 12 so as to individually correct their resistance before, and as close as possible to, the integration phase.

More especially and without this implying any limitative feature of the invention, the method that follows applies to a temperature-controlled bolometric detector, e.g. bolometers cooled by Peltier effect modules (or thermoelectric coolers (TEC)), the imaging bolometers 12 whereof have a negative resistance coefficient, i.e. their resistance diminishes as their temperature rises. Bolometers 12, taking the form of membranes suspended above a substrate for example, are of the semiconductor type with their material that is sensitive to temperature variations being amorphous silicon (a-Si) or a vanadium oxide that is generically designated "VOx".

The method according to the invention starts with a calibration phase 70 that is performed, for instance, at the factory and/or on a regular basis in order to take into account detector drift over the course of time.

This calibration phase 70 involves a first step 72 to expose the detector to a uniform scene for a given, constant focal plane temperature TPF. To achieve this, the detector is placed, for instance, in front of a reference black body or, if applicable, the mechanical shutter of the detector is closed. Temperature TPF is the temperature to which the detector is adjusted when in use. It should also be noted that, since the substrate in which readout circuitry 46 and control circuitry 52 are formed and above which the bolometric membranes are formed is arranged in the focal plane of optics, this temperature will be referred to either as the temperature "of the focal plane" or the temperature "of the substrate".

Array 40 of bolometers 12 is then read, row by row, in step 74, with each row being successively connected to readout circuitries 46 located at the end of a column by closing read switches 16 which causes biasing of imaging bolometers 12. Connecting a row to circuitry 46 is preceded by discharging capacitors 24 by closing zero reset switches 26 and then opening them. In this step 74, transistors 32 of compensation circuitries 20 are forced to the off state so as to cancel out common-mode currents and imaging bolometers 12 are biased with a low voltage in order not to saturate capacitors 24 of integrators 18.

Voltages Vout on the output of integrators 18 that result from integrating the currents that flow through imaging bolometers 12 are then analyzed by management unit 69 in order to determine the corresponding resistances of bolometers 12 of array 40 in a manner that is known in itself from the prior art.

On completion of readout step 74, one thus obtains, for focal plane temperature TPF, a table $R_{ac}$ of values of resistances $R_{ac}(i,j)$ that correspond to bolometers 12 of array 40 of the detector using the following tabular notation:

$$R_{ac} = \begin{pmatrix} R_{ac}(1,1) & R_{ac}(1,2) & \ldots & R_{ac}(1,M) \\ R_{ac}(2,1) & R_{ac}(2,2) & \ldots & R_{ac}(2,M) \\ \vdots & \vdots & \ddots & \vdots \\ R_{ac}(N,1) & R_{ac}(N,2) & \ldots & R_{ac}(N,M) \end{pmatrix} \quad (2)$$

This table is then stored in management unit 69.

Calibration phase 70 then continues by determining, by means of management unit 69, a resistance correction quantity for each of imaging bolometers 12 in step 76.

More especially, the smallest of the measured resistances $k_{ac}^{min}$ of table $R_{ac}$ is determined and a reference resistance $R_{min}$ that equals, or is preferably slightly less than, resistance $R_{ac}^{min}$ is determined. Resistance $R_{min}$ is the target resistance of the correction according to the invention to which the resistances of imaging bolometers 12 are adjusted before readout biasing in the special case where the detector is once more placed in the same uniform thermal illumination conditions as in calibration phase 70. In the general case of observing an arbitrary scene, the same individual resistance corrections will be applied using the same method. This results in elimination of resistances that are independent of the scene, as is also described in detail below.

One thus obtains, in step 76 a table $\Delta R_0$ of individual correction quantities $\Delta R_0(i,j)$ for the resistances of bolometers 12 in accordance with the following tabulated equation:

$$\begin{aligned}\Delta R_0 &= \begin{pmatrix} \Delta R_0(1,1) & \Delta R_0(1,2) & \ldots & \Delta R_0(1,M) \\ \Delta R_0(2,1) & \Delta R_0(2,2) & \ldots & \Delta R_0(2,M) \\ \vdots & \vdots & \ddots & \vdots \\ \Delta R_0(N,1) & \Delta R_0(N,2) & \ldots & \Delta R_0(N,M) \end{pmatrix} \\ &= \begin{pmatrix} R_{ac}(1,1)-R_{min} & R_{ac}(1,2)-R_{min} & \ldots & R_{ac}(1,M)-R_{min} \\ R_{ac}(2,1)-R_{min} & R_{ac}(2,2)-R_{min} & \ldots & R_{ac}(2,M)-R_{min} \\ \vdots & \vdots & \ddots & \vdots \\ R_{ac}(N,1)-R_{min} & R_{ac}(N,2)-R_{min} & \ldots & R_{ac}(N,M)-R_{min} \end{pmatrix}\end{aligned} \quad (3)$$

Calibration phase 70 then completes by management unit 69 storing array $\Delta R_0$.

The following phases of the method are implemented when the detector is used by a user. The following explanations should be read in conjunction with FIGS. 4, 5A and 5B.

Figure 4:
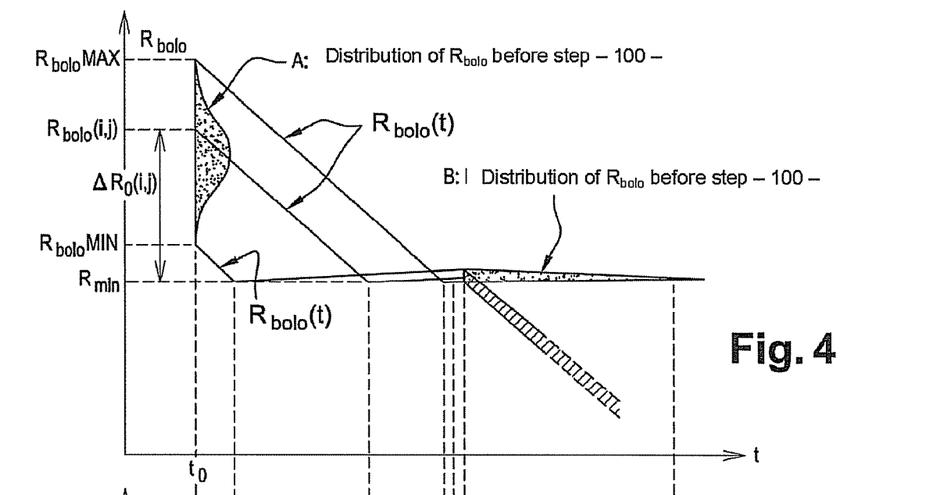
FIG. 4 is a diagram that explains changes in the resistances as a function of time subsequent to the invention being applied.
Figure 5A:
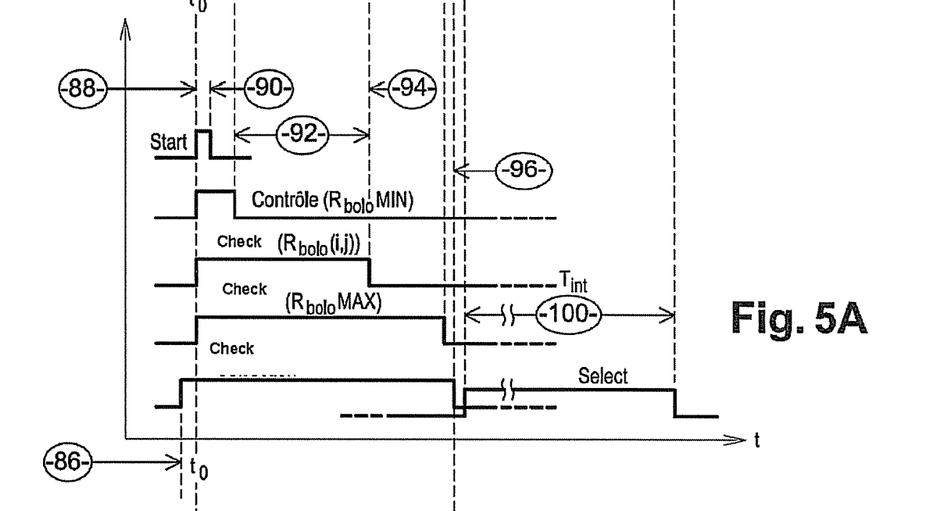
FIGS. 5A and 5B are timing diagrams for various signals used to control switches and that are produced when the method according to the invention is used.

FIG. 4 illustrates changes in the resistances of a single row over time when the invention is implemented. For the sake of clarity, these changes correspond to exposing the detector to a uniform scene and it is assumed that the distribution of the resistances only includes contributions of a technological nature and the thermal distribution of the substrate, i.e. those equivalent to the conditions in calibration phase 70. Obviously, for ordinary use when exposed to an arbitrary scene which is the point of interest of the invention, what happens to the population of resistances will be commented on. FIG. 5A shows the control signals of the various switches that are produced when a first embodiment of the method according to the invention is used by the system in FIG. 2.

When the detector is used, a correction phase 80 for the resistances of the bolometers 12 in a row of array 40 is performed before and as close as possible in time to the readout phase 82 of said row.

More especially, the correction phase 80 of a row of array 40 starts in 84 by adjusting each of the voltages Vref of control circuitries 52. Voltage Vref of a circuitry 52 is then adjusted to an individual value relative to pixel 12 of the column associated with circuitry 52 as explained in more detail below.

Once voltages Vref have been adjusted to individual values, correction phase 80 continues, in 86, by closing the correction switches 53 of the row of pixels with the selection switches 16 of the latter remaining opened.

In next step 88, switches 56 that are connected to current sources 54 are then closed by a brief "Start" pulse provided by sequencer 48 on the "Check" command, through an OR gate, the role of which will be clarified further below, so that a current having the value Iref flows through bolometers 12. In the text below, the closing of switches 56 marks the timeline "0" origin point.

Bearing in mind the fact that, given the nature of such an amplifier, operational amplifier 58 of circuitry 52 has a very high-impedance non-inverting input (+), all of the current Iref generated by current source 54 flows through bolometer 12 which is connected to that input. Voltage Vin on the non-inverting input (+) then assumes the following value at instant "0":

$$Vin(0) = Iref \cdot R_{bolo}(0) \qquad (4)$$

where $R_{bolo}$ is the resistance of bolometer 12. The notation $R_{ac}$ is not used in this phase in order to differentiate the values of resistances during calibration ($R_{ac}$) from resistance values ($R_{bolo}$) when in use, these are generally different because they depend on the element of the scene observed by each sensitive pixel. For the sake of clarity, however, the notation $R_{bolo}$ is used in FIG. 4 in conformity with the situation when the detector is in use but the distribution of resistances is deliberately chosen to be identical to that produced by the calibration situation, in this particular case one has decided $R_{bolo} = R_{ac}$.

At the same time as closing switches 56 which connect current sources 54 to bolometers 12, switches 64 which are connected to capacitors 60 are also closed by the "Start" pulse and the effect of this is to bring, almost immediately, the (+) input of comparator 62 and the armature of capacitor 60 which is connected to it to potential Vclamp.

Because amplifier 58 of circuitry 52 is mounted as a voltage follower, the output voltage of the latter therefore equals voltage Vin on its non-inverting input (+). Thus, voltage Vcap across the terminals of capacitor 60 is forced, at instant "0", to the value Vcap in accordance with the following equation:

$$Vcap = Vclamp - Vin(0) + V_{off} = Vclamp - Iref \cdot R_{bolo}(0) + V_{off} \qquad (5)$$

where $V_{off}$ is the so-called offset voltage between the two inputs of amplifier 58.

The duration of step 88 is sufficiently short, relative to the total duration of correction phase 80, to allow one to consider that, during step 88, resistance $R_{bolo}$ of bolometers 12 of the row that is currently being corrected changes little despite the Joule effect caused by biasing them. The duration of step 88 essentially depends on the value of the capacitance of capacitors 60 and the value of current Iref and is, by way of example, around 500 nanoseconds.

At the start of next step 90, the state of the switches 64 that are connected to capacitors 60 is changed to the open state when the "Start" pulse returns to its low level. Note that, at this stage, capacitors 60 do not discharge and keep the voltage difference Vcap constant across their terminals and these voltage differences will be preserved until the "Start" signal is subsequently activated because the branch connected to the positive input (+) of comparator 62 of circuitry 52 has a very high impedance.

This branch therefore floats and its voltage $V_+$ assumes a value in accordance with the following equation:

$$V_+(t) = Vcap + Vin(t) + V_{off} = Vcap + Iref \cdot R_{bolo}(t) + V_{off} \qquad (6)$$

where t is the time counted down after instant "0".

Note that self-heating of a bolometer 12 (with a negative resistance coefficient) due to the Joule effect causes its resistance $R_{bolo}$ to drop. In fact, and as known in itself, it has been demonstrated that the resistance $R_{bolo}$ of such a bolometer varies as a function of temperature in accordance with the equation:

$$R_{bolo} = R_{abs} \cdot \exp\left(\frac{E_A}{k \cdot T}\right) \qquad (7)$$

where:
$R_{abs}$ is an absolute resistance of the bolometer, the value of which depends on technological parameters;
$E_A$ is the thermal conduction activation energy of the bolometric material;
k is Boltzmann's constant; and
T is the absolute temperature of the bolometer expressed in degrees Kelvin.

Thus, to the extent that the temperature T of the bolometer increases due to the Joule effect, its electrical resistance $R_{bolo}$ diminishes. FIG. 4 schematically shows this reduction as a linear, first-order approximation. Also note that if injected current Iref is comparable to the bias current used during integration, the slopes dR/dt of the two segments are comparable during the correction and integration phases, as shown in FIG. 4.

Voltage $V_+$ thus changes over time in accordance with the equation:

$$V_+(t) = Vcap + Iref \cdot R_{bolo}(t) + V_{off} = Vclamp - Iref \cdot (R_{bolo}(0) - R_{bolo}(t)) = Vclamp - Iref \cdot \Delta R_{bolo}(t) \qquad (8)$$

Voltage $V_+$ therefore follows the variation $\Delta R_{bolo}(t)$ in the resistance of bolometer 12 due to the effect of its self-heating and therefore diminishes as a function of time. As long as voltage $V_+$ on the positive input (+) of comparator 62 exceeds voltage Vref on its negative input (−), materialised by step 92, the "check" signal that controls switch 56 which is connected to source 54 is held in a high state through OR gate 63. Switch 56 therefore remains closed and current Iref continues to flow through corresponding bolometer 12 and voltage $V_+$ continues to diminish.

When voltage $V_+$ reaches voltage Vref that is imposed on the negative input (−) of comparator 62, the latter's output changes to zero, in step 94, and this has the effect of opening switch 56 (OR gate 63 confirms the low state because the "Start" signal is also in a low state) and hence stops the injection of current into bolometer 12. Switches 53 of pixels 42 of the row that is currently being corrected are then opened by the change of state of the "Correction" command that occurs in step 96.

According to the invention, voltage Vref of correction circuitry 52 is adjusted to a value in accordance with the following equation:

$$Vref = Vclamp - Iref \cdot \Delta R_0(i,j) \qquad (9)$$

$\Delta R_0 (i,j)$ corresponds to the individual value of array $\Delta R_0$ relative to bolometer 12 of the pixel 42 to which circuitry 52 is connected.

Thus, when the switch 56 changes to its open state and to the extent that, at this instant, the condition $V_+ = Vref$ is met, the resistance of the bolometer has undergone a variation $\Delta R$ equal to $\Delta R_0(i,j)$.

FIG. 4 shows, in particular, changes over time in the highest resistance ($R_{bolo}$MAX), the lowest resistance ($R_{bolo}$MIN) and any intermediate resistance ($R_{bolo}(i,j)$) of a single row i that is in the process of being corrected. Current injection stops (the resistance no longer diminishes) in each resistance at instants that are defined by the respective values $\Delta R_0(i, j)$ in accordance with the stated principle. The "Correction" signal controlled, preferably in an adjustable manner, by sequencer 48 is held in a high state for a duration that is sufficient for the highest resistance (equals $R_{bolo}$MAX at the zero instant) to have time to vary by the highest quantity $\Delta R_0$ in table $\Delta R_0(i,j)$. In the particular case chosen for the sake of clarity when explaining FIG. 4 which reproduces the thermal conditions of the calibration phase, all the resistances finish changing in step 94 at value $R_{min}$.

The method then continues with readout phase 82 during which zero reset switches 24 of readout circuitries 46 are closed and then reopened in 98 (not shown in FIG. 5A because this operation runs in parallel with step 80) in order to discharge capacitors 24 of integrators 18, then the read switches 16 of pixels 12 of the row that is currently being read are closed in step 100 by activating the "Select" command in order to connect the pixels 12 of the row to circuitries 46 for a duration that defines the predetermined integration time Tint as explained above.

During the time period between step 94 and step 100, which is variable depending on the bolometer in question, the latter's temperature tends to return to its equilibrium value at a rate that is limited by the thermal time constant of the bolometers; this results in slight restoration of the natural variations in resistance, typically accompanied by inversion of the distribution order, as indicated in FIG. 4, without this having any insurmountable adverse effect, given the very small time periods in question (several microseconds).

Step 82 of the method then loops to step 84 in order to correct the resistances and read the bolometers of the next row i+1 of array 40. At the same time, between the start of step 88 and the start of step 100 for row i+1, a sample and hold operation (not shown in FIG. 5A) is performed on voltages $V_{out}$ of row i. Multiplexing of the stream of signals to output amplifier 49 may, if necessary, extend into the integration phase for row i+1, as is known in itself.

FIG. 4 shows the attraction of setting value $R_{min}$ below the set of values $R_{ac}(i,j)$. Adopting this procedure, the values of all the resistances are modified before the start of the integration step by injecting current Iref. If value $R_{min}$ is set too high, some of the bolometers will actually not be affected by the resistance adjustment and this would produce image distortion due to a local correction defect. On the other hand, if this value is set significantly below the minimum distribution value, this will necessitate a pointlessly long duration in order to obtain standardisation of all the resistances and this would have nothing but disadvantages. The time periods that are not specified in FIG. 4 are defined on the basis of nominal signal settling criteria, as is customary in the profession, without any other particular constraints.

Before the bolometers are read, their resistances are therefore corrected by a predetermined quantity. By way of a numerical example, a resistance correction typically takes 4 to 8 microseconds in order to apply a resistance offset of 2% due to the Joule effect. More generally, the time during which current Iref is applied is several microseconds; this time is short compared with the usual integration times Tint which last several dozen microseconds or the duration of a read frame which usually equals 16 ms. Note also that it is possible to shorten the duration of correction by applying a higher current Iref without having to modify the circuits or operation described above.

As indicated, FIG. 4 shows the population of resistances of imaging bolometers 12 of array 40 before they are corrected (histogram "A") and after correction (histogram "B") in a case where the thermal conditions are representative of the calibration phase. Note that the variability of the resistances of bolometers 12 is substantially reduced before they are read, by correction in accordance with the invention. Thus, the effect of offset variability on formed images is substantially lessened and the residual dynamic response is substantially increased.

In the general case of use when exposed to an arbitrary scene, the distribution of the resistances is defined by the radiant flux absorbed by each bolometer 12. As a result, histogram "A" before correction step 80 will typically have a different shape and, above all, be wider. Nevertheless, correction step 80, applied as described above, results in a histogram "B" corrected to take into account the incidence of so-called natural variations of resistances because each of these resistances $R_{bolo}(i,j)$ will have had, in step 94, its value reduced by quantity $\Delta R_0(i,j)$ which is representative of its individual offset under the reference conditions. The final values are no longer uniformly $R_{min}$ but a value that is ideally representative only of the scene.

What is more, in most cases, the width of this histogram "B" before integration step 100 is less than that of uncorrected histogram "A" (by the width of the amplitude of the corrections) and this results in appreciable gain in the dynamic scene response of the detector.

In other words, it should be noted that shifting the resistances of bolometers 12 towards a lower resistance does not destroy, in any way whatsoever, the thermal information obtained from the scene contained in the value of the resistances of bolometers 12. In fact, correcting the resistances of bolometers 12 involves simply shifting the resistances on the basis of quantities that are not dependent on the value of the resistances at the instant the correction is applied. Because of this, the distribution of the resistances associated with the thermal distribution of the scene is still present in the resistances after the correction phase.

This correction is therefore similar to a "1-point" type offset correction as described above, i.e. comparable to closing a mechanical shutter followed by associated corrections and at the continuous level of voltages Vout on the output of integrators 18. However, in contrast to this type of correction performed using electronics and/or an algorithm not located in the readout circuit, correction according to the invention does not impose any limitation in terms of dynamic response to the signal on the detector's output. On the contrary, by reducing the variability of the resistances and thus the variability of bias currents Iac that flow through bolometers 12 when they are read, it is possible to improve the residual dynamic response and/or increase the bias voltage of bolometers 12, as the user chooses.

Note also that, as a direct consequence of correction according to the invention, a large proportion of sensitivity variations are eliminated without there being any need to apply additional computing or processing. Sensitivity is actually inversely proportional to the value of each resistance.

Figure 6:
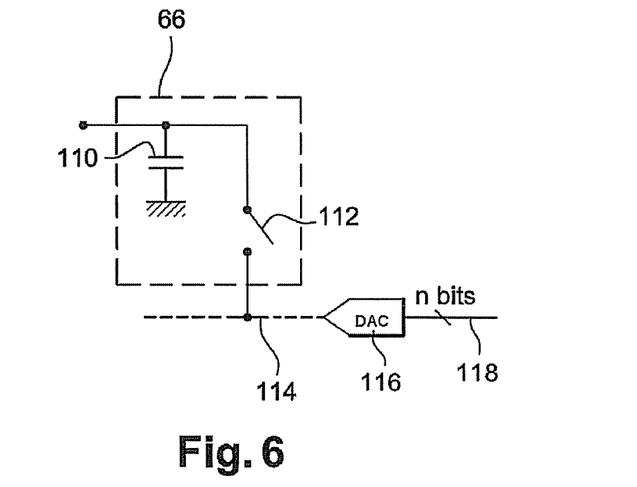
FIG. 6 is a schematic view of a first embodiment of a source of individual reference voltage Vref which forms part of the bolometric detection device according to the invention.
Figure 7:
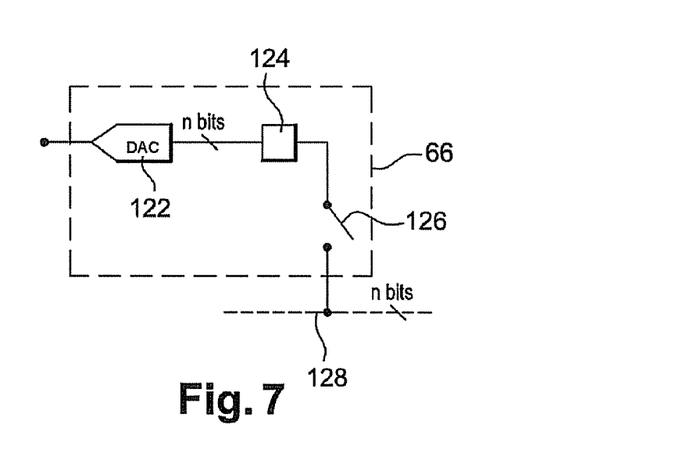
FIG. 7 is a schematic view of a second embodiment of a source of individual reference voltage Vref in accordance with the invention.

FIGS. 6 and 7 show examples of embodiments of programmable voltage source 66.

The first example, shown in FIG. 6, is based on analogue multiplexing. Voltage source 66 comprises a capacitor 110 that is connected between the negative terminal of comparator 62 of control circuitry 52 and ground and a controllable switch 112 that is connected between said negative input and an analogue multiplexing bus 114. This bus 114 is itself connected to a digital-to-analogue converter 116 which receives, on its input, a digital value, e.g. in n bits, of voltage Vref that needs to be produced by voltage source 66. This digital voltage value is supplied by associated management unit 69 to the detector and sent over bus 114 in serial mode during step 84, as detailed below.

In order to produce a particular analogue voltage Vref, the digital value that corresponds to this voltage is initially converted into analogue voltage Vref on bus 114 by means of converter 116. Switch 112 is then closed and capacitor 110 charges to voltage Vref. Once charging is finished, switch 112 is opened, leaving bus 114 and converter 116 free to be used in order to adjust voltage Vref of another control circuitry 52. Once all the voltages Vref of the row of circuits 52 have charged, said currents are ready to be used in accordance with the invention and the process restarts by charging the voltages Vref that relate to the next row.

Analogue multiplexing can be used to implement the invention despite temporal changes to pre-charged voltages Vref due to slight leakage currents because the useful time for which these voltages are maintained corresponds roughly to 1 row time, i.e. several dozen microseconds.

The second example of an embodiment of voltage source 66, shown in FIG. 7, is based on digital multiplexing. Voltage source 66 comprises a digital-to-analogue converter 122 whose output is connected to the negative input of comparator 62 of control circuitry 52, an n-bit digital register whose output is connected to the input of converter 122, and a controllable switch 126 which is connected between the input of register 124 and an n-bit digital multiplexing bus 128.

In order for source 66 to produce a particular analogue voltage Vref, a digital value for this voltage is initially produced on bus 128 by management unit 69 which is associated with the detector and then switch 126 is closed. The digital value on bus 128 is then stored in register 124 and converted by converter 122 into voltage Vref. Once storage in register 124 is finished, switch 126 is opened, leaving bus 128 free to be used in order to adjust voltage Vref of another control circuitry 52. Once all the registers 124 of the row of circuits 52 have been programmed, said circuits are ready to be used in accordance with the invention and the process restarts by loading the digital data that relates to producing voltages Vref and that is required in order to read the next row.

Also note that, as evidenced in FIG. 4, the time needed to obtain correction of the resistances of all the bolometers 12 of a row of array 42 depends on the correction quantities $\Delta R_0(i, j)$. Since values $\Delta R_0(i,j)$ are not equal, the correction time therefore varies from one bolometer to another. Also, the bolometers in a row are necessarily read synchronously. Consequently, the duration of correction phase 80 must be chosen so that all the corrections of the resistances of the bolometers in a single row are effective and that the read phase 82 of this row starts without waiting unduly after the end of correction phase 80. Actually, it is convenient for read phase 82 and, more especially, the latter's integration phase to be performed as close as possible to correction of the resistances so as to avoid any restoral of the variability of the resistances of the bolometers which is distinctive of the detector's thermal equilibrium. Such restoral is, in fact, produced by a natural relaxation effect linked to the thermal time constant of the bolometers, as already stated and shown in FIG. 4.

Generally speaking, there may therefore be a slight time lag between the end of a particular correction of a bolometer 12, the duration of which is less than that of correction phase 82, and the start of integration phase 100 which is performed on that bolometer. This time lag is, however, not critical as long as it remains less than the time of the read frames (usually 16 ms) and the thermal time constant of the bolometers which is classically 5 ms to 15 ms.

In addition, the system described above can be modified in accordance with a second embodiment which differs from the embodiment described in relation to FIG. 2 in terms of the current sources of control circuitries 52 which output currents Iref depending on the corrections that are to be made in order to obtain an equal correction duration $\Delta T$ for all the bolometers.

In this case, a table of currents Iref(i,j) is calculated on the basis of the table of corrections $\Delta R_0(i,j)$, for example in accordance with the equation proposed below, and module 52 is reduced to current generator 54 which is associated with means of programming current Iref and has the layout shown in FIG. 8 for instance. The functional timing diagram shown in FIG. 5A boils down to the "Correction" signal which is changed to a high state on duration $\Delta T$. This embodiment does not require any switches 56 because the time $\Delta T$ for which current Iref is applied can be defined directly by the state of switch 53 which is controlled by sequencer 48.

In this case, the correction phase 80 for a row i of array 50 starts in 84 by individually digitally programming the currents that are to be produced by each of the generators 54 of circuitries 52. Correction phase 80 continues in 86 which corresponds to closing the switches 53 of the row of pixels with the selection switches 16 of the latter remaining opened. This phase finishes in 96 by opening switches 53 (the "correction" command returns to a low state) after a predetermined duration $\Delta t$. The rest of the process is identical to that described earlier.

Figure 8:
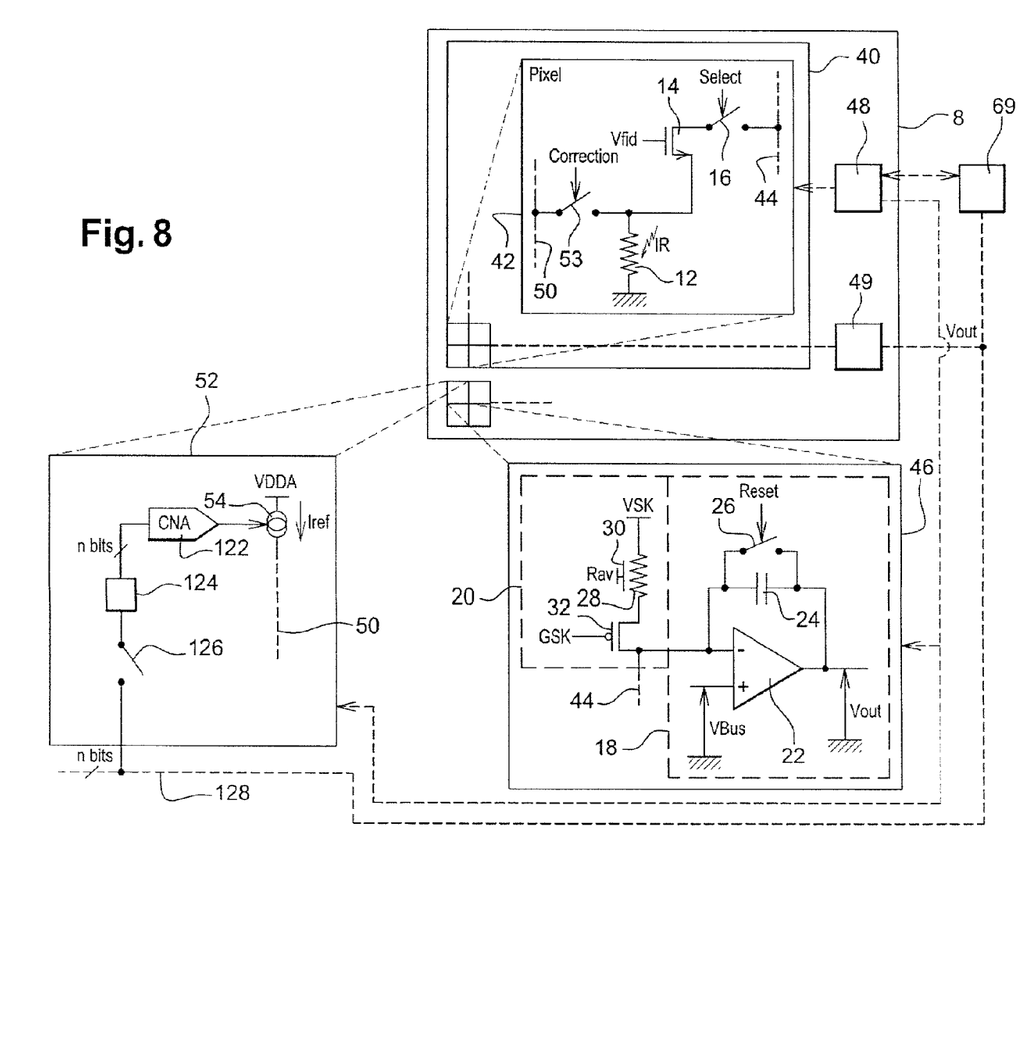
FIG. 8 is a schematic view of a second embodiment of a bolometric array detection device in accordance with the invention which uses a source of individual reference current Iref.

Loading the current values is typically realised digitally by using multiplexing similar to that described in relation to FIG. 7 and shown schematically in FIG. 8. In this case, the DAC controls one current generator per column with the value of the currents output by generators 54 of each column being updated one row at a time.

Figure 9A:
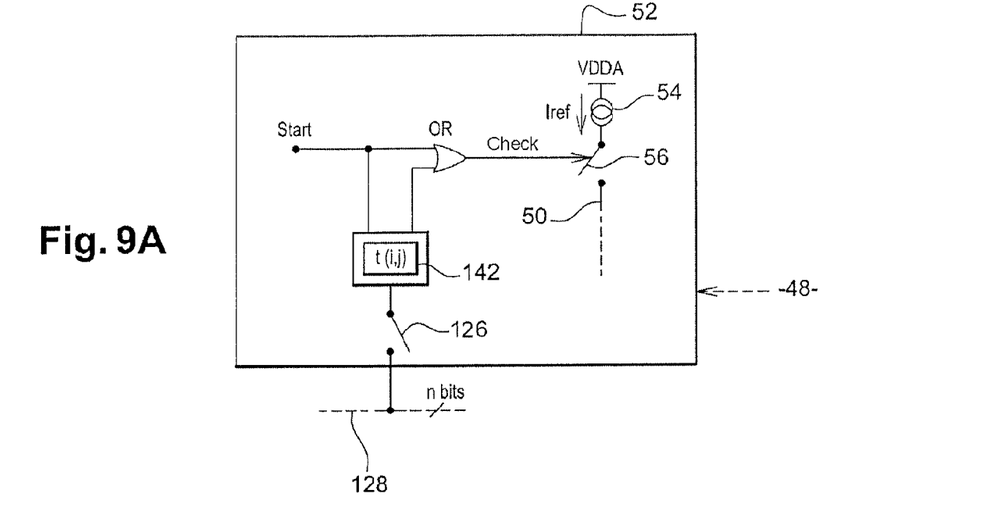
FIGS. 9A and 9B are schematic views of devices for time-based control that are part of a third embodiment of a bolometric detection device in accordance with the invention.

A third embodiment is described below. This embodiment differs from the embodiment in FIG. 2 by virtue of the control circuits for the resistances 52 of bolometers 12, as illustrated in FIG. 9A.

In this embodiment, a control circuit 52 comprises, like a control circuit 52 in the first embodiment, a current source 54 capable of outputting a current having a constant value Iref and connected to column bus 50 via a switch 56 that is controlled by an OR logic gate, one input of which is controlled by a "Start" command. The other input follows the output of an interval timer 142. The value of duration t(i,j) is pre-programmed in n bits in timer 142 as a function of the pixel 12 to which control circuit 52 is connected. Timer countdown is triggered by the "Start" command on timer 142 which confirms the high state of the "Check" signal via the OR gate when the "Start" pulse changes back to the low state. The timing diagram for the digital signals in FIG. 5A applies at every point.

More especially, it has been demonstrated that the temperature of a bolometer 12 when a current at a constant voltage Vac flows through it can be modelled in accordance with the following equation:

$$C_{th} \cdot \frac{\partial \theta(t)}{\partial t} = -\frac{\theta(t)}{R_{th}} + Pir + \frac{V_{ac}^2}{R_{abs} \cdot \exp\left(\frac{E_A}{k(TPF + \theta(t))}\right)} \quad (10)$$

where:
$C_{th}$ is the heat capacity of the bolometer;
$R_{th}$ is the thermal resistance of the bolometer relative to the substrate;
Pir is the power of the infrared radiation absorbed by the bolometer;
TPF is the absolute temperature of the focal plane; and
$\theta$ is the temperature rise of the bolometer caused by the current that flows through it.

In addition, without having to resort to non-linear differential equation solvers, it is apparent that the invention is designed to compensate for a very small relative deviation between the extreme values of table $R_{ac}$, generally around 2%, for bolometric materials whose coefficient of relative variation in resistance as a function of temperature: $TCR = -E_A/(k \cdot TPF^2)$ or "resistance coefficient" is of the same order, namely $-2\%/K$.

The temperature difference $\theta(i,j)$, corresponding to $\Delta R_0(i,j)$, to be reached for the most resistive bolometer is consequently very small and is of the order of one degree. Such a temperature rise is achieved within several microseconds if the bolometer is subjected to a current of roughly the same order as that which is usually used to read the bolometer. This duration is negligible compared with the thermal time constant of the bolometer which is usually 5 ms to 15 ms. The term $$-\frac{\theta(t)}{R_{th}}$$

in equation (10) which expresses the equilibrium thermal losses can therefore be ignored.

Also, because the invention aims to impose a variation in resistance beyond a reference point where the equilibrium temperature when exposed to the incident infrared radiation is reached, the term Pir is therefore not involved in the duration of the bolometer's temperature rise.

Finally, since the term $\theta$ in equation (10) is negligible compared with absolute temperature TPF, temperature rise $\theta$ can be modelled as a function of time t in accordance with the equation:

$$\theta = t \cdot \frac{V_{ac}^2}{R_{ac} \cdot C_{th}} \quad (12)$$

With the help of equation (12), it is therefore possible to determine the temperature-rise durations $t(i, j)$ that are to be applied to bolometers 12 in order to obtain resistance corrections $\Delta R_0(i, j)$ in accordance with the equation:

$$t(i, j) = \frac{k \cdot TPF^2 \cdot C_{th}}{E_A \cdot V_{ac}^2} \cdot \Delta R_0(i, j) \quad (13)$$

Thus, according to the third embodiment of the invention, table $\Delta R_0$ of individual resistance correction quantities is replaced by table $\Delta T_0$ which contains the temperature-rise durations $t(i, j)$ that are to be applied in order to produce said quantities. The correction phase for a row of array 40 of pixels 12 thus involves loading the corresponding duration values in interval timers 142, closing switches 56 (switches 16 remain open and switch 53 is closed) and then opening each of them after an individually customised duration $t(i, j)$. The resistance of each of bolometers 12 of a row is thus corrected by their corresponding quantity $\Delta R_0(i, j)$.

Nevertheless, the first embodiment described in relation to FIG. 2 is preferred insofar as instants $t(i, j)$, regardless of whether they are calculated by a solver or in accordance with equation (13), depend on the value $C_{th}$. Using a single value of $C_{th}$ for all bolometers 12 is an approximation that may lead to measurement inaccuracy insofar as this parameter of bolometers exhibits natural technological variability. What is more, using a single value TPF for the temperature of the focal plane is equivalent to assuming that the substrate has a spatially uniform temperature; this is not always the case and is therefore also a source of inaccuracy unless it is taken into account by the correction unit when calculating the times $t(i,j)$ for the spatial temperature distribution of the focal plane with the aid of several sensors that are in contact with or embedded in substrate 10.

This third embodiment can advantageously be associated with operation whereby step 94 which corresponds to the end of current injection is simultaneous for all circuits 52. Such operation is obtained by closing switch 56 of each circuit 52 after a wait time that corresponds to the additional time $t(i,j)$ relative to time $t(i,j)$MAX which corresponds to the bolometer that is initially the most resistive in table $\Delta T_0$.

Figure 5B:
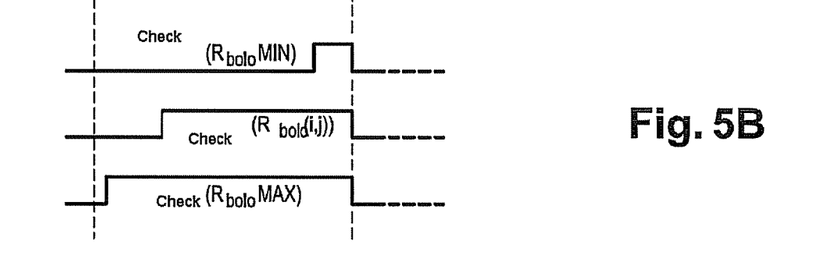
Figure 9B:
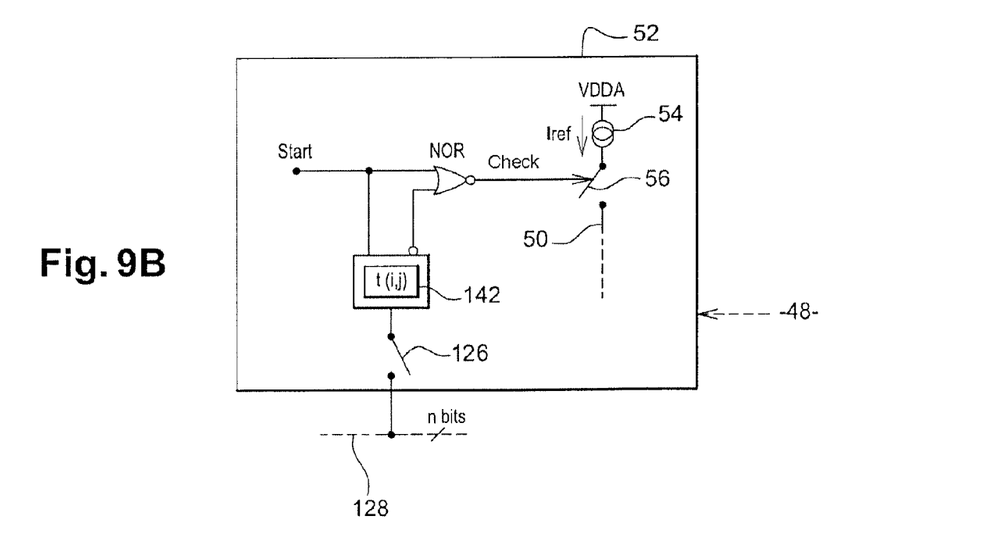

FIG. 9B shows a version of control circuit 52 which produces this result, in relation to the timing diagram in FIG. 5B. In FIG. 5B, only the "Check($R_{bolo}$ MIN)", "Check($R_{bolo}$ MAX)" and "Check($R_{bolo}$ (i,j))" signals are shown, the "Start", "Correction" and "Select" signals being identical to those in FIG. 5A.

In FIG. 9B, the OR gate used in FIG. 9A is replaced by a NOR gate and the output polarity of timer 142 is reversed. In addition, table $\Delta T_0$ which is used to preload timers 142 is replaced by additional table $C\Delta T_0$ in which each element equals $[t(i,j)MAX - t(i,j)]$. As before, the "Start" signal initiates countdown of the individual times for each timer 142 which closes associated switch 56 when the additional time $Ct(i,j)$ has elapsed. Closing switch 53 ("Correction" signal in low state) marks the end of current injection and of correction step 80 for all the bolometers in a single row i at the same instant.

Thus, all the bolometers have the same time to return to thermal equilibrium before the start of phase 100 and this time is advantageously adjustable to a very small value. Usual clock frequencies of around 10 MHz allow a unitary time increment of around 50 to 100 ns which is easily precise enough to implement the invention according to this third embodiment effectively.

This embodiment will therefore typically only be preferred, to the extent that the circuit is simpler compared with that in FIG. 2 given as an example of realisation according to the first embodiment, if the technological variability of parameter Cth can be considered to produce negligible variability of output signals Vout with regard to the effect of other variations that are independent of the scene.

As stated above, variation in resistance before integration may, according to the second embodiment mentioned earlier, be imposed by means of a current $I_{ref}$ that is applied for a uniform duration $\Delta t$. It is easy to demonstrate that, in this case, bearing in mind the same considerations that lead to equation 12, the first-order expression of temperature rise $\theta$ is:

$$\theta = \Delta t \cdot \frac{R_{ac} \cdot I_{ref}^2}{C_{th}} \quad (14)$$

As with $\Delta R = TCR \cdot \theta$, the absolute (by virtue of the tabulated relation (3)) variations in resistances are expressed by:

$$\Delta R_0(i, j) = \frac{E_A}{k \cdot TPF^2} \Delta t \cdot \frac{R_{ac}(i, j) \cdot Iref^2(i, j)}{C_{th}} \quad (15)$$

Currents Iref(i,j) can therefore be expressed by the equation:

$$Iref(i, j) = \sqrt{\frac{k \cdot TPF^2}{E_A \cdot R_{ac}(i, j) \cdot \Delta t} \cdot C_{th} \cdot \Delta R_0(i, j)} \quad (16)$$

This expression allows numerical estimation of each current Iref(i,j) that is to be applied for the chosen duration Δt. This implementation of the invention has the advantage of simultaneously setting all the resistances of bolometers 12 to values, before integration, that are devoid of variations that are independent of the scene on the row that is currently being processed at an instant that is preferably very close to the start of the integration phase. There is then essentially not enough time for variations associated with thermal relaxation towards equilibrium to manifest themselves.

In the case of this embodiment, curves $R_{bolo}(t)$ in a diagram such as that in FIG. 4 show a series of segments having different slopes which converge at a single point having the value $R_{min}$ at the end of duration Δt. Duration Δt is adjustable thanks to the associated setting of currents Iref(i,j) to a value that is, firstly, appropriate to the desired correction accuracy and, secondly, does not extend the row time, e.g. below the time required for the sample and hold phase that precedes and follows each row integration phase.

The embodiments described above apply to bolometers made of a bolometric material whose resistance diminishes as its temperature rises, i.e. a bolometric material that has a negative resistance coefficient, such as a semiconductor material consisting of amorphous silicon (a-Si) or vanadium oxide (VOx).

But the invention also applies to bolometric materials that have a positive resistance coefficient, i.e. materials whose resistance increases as their temperature rises, such as metals, especially titanium.

In this application, correction in accordance with invention involves increasing the resistance of each bolometer rather than reducing it as described above so as to obtain a distribution that is substantially concentrated around resistance $R_{max}$ of table $R_{ac}$ of resistances obtained during the calibration phase.

Embodiments of the invention that apply to temperature-controlled bolometric detectors are also described above.

But the invention also applies to detectors that are not temperature controlled and more commonly referred to as "TEC-less".

In a first version of such an application, the correction quantities $\Delta R_0(i, j)$ are adjusted at the start of the correction phase as a function of the temperature of the focal plane, measured by a sensor located on the substrate, e.g. a semiconductor sensor formed directly in the readout circuitry. For example, during the detector calibration phase, a plurality of correction tables $\Delta R_0$, having a respective duration $\Delta T_0$, are acquired as a function of several focal plane temperatures TPF and stored in the detector. When the detector is used, one particular table among these stored tables is selected or interpolated as a function of the measured temperature $TPF_{mes}$ of the focal plane. This design, however, makes it necessary to acquire several reference tables and this can be a long and therefore expensive process.

In one preferred version, a single reference table Rac is acquired during the detector's calibration phase. Because there is a known model for variation of the resistance of bolometers as a function of temperature, e.g. equation (7), a table of resistances $Rac_{TPFmes}$ is calculated regularly and/or periodically when using the detector as a function of the measured temperature $TPF_{mes}$ of the focal plane and of reference table $R_{ac}$. Using equation (7), the individual values $Rac_{TPFmes}(i,j)$ are then calculated in accordance with the equation:

$$Rac_{TPF_{mes}}(i, j) = R_{ac}(i, j) \cdot \exp\left(\frac{E_A}{k \cdot TPF} - \frac{E_A}{k \cdot TPF_{mes}}\right) \quad (14)$$

Once table $Rac_{TPFmes}$ has been calculated, correction table $\Delta R_0$ is determined then the corresponding reference voltages Vref, or currents Iref(i,j), or corresponding temperature-rise durations t(i, j), as described above.

Using a model of the resistance of the bolometers as a function of temperature thus makes it possible to avoid having to acquire a plurality of resistance tables.

Moreover, in order to improve correction accuracy in accordance with the invention further still by reducing the variability of the corrected resistances, the spatial variation of the temperature of the focal plane can also be taken into account by using several temperature sensors located on the focal plane. Spatial modelling of the focal plane temperature is then used as a function of the temperature measurements in order to determine the temperature of the substrate at the level of each imaging bolometer. The quantity needed to correct the resistance of a bolometer is then calculated as a function of the corresponding temperature of the substrate.

The invention claimed is:

1. A device for detecting infrared radiation comprising:
an array of bolometers for detecting infrared radiation; and
in order to read each of said bolometers, a signal shaping circuit comprising:
readout biasing circuitry that biases the bolometer at a predetermined voltage in order to make a current flow through the bolometer;
common-mode rejection circuitry that generates a common-mode current; and
integrating circuitry that integrates the difference between the current that flows through the bolometer and the common-mode current,
wherein the device comprises correction circuitry for correcting the resistance of the bolometers that injects current into each of said bolometers in order to shift the resistance by a predetermined quantity that depends on an offset of said bolometer, current injection being performed prior to readout biasing of the bolometer and the shift being performed according to the direction in which the resistance of the bolometer varies as a function of temperature and wherein the correction circuitry shifts the resistances of said bolometers towards a common value,
wherein the correction circuitry comprises the following circuit elements in order to inject current into the bolometer:
a constant current source;
a first controllable switch that connects and disconnects the current source to or from the bolometer; and
comparison circuitry that compares the voltage across the terminals of the bolometer with a first predetermined voltage that depends on the offset and opens the first controllable switch, thereby disconnecting the constant current source from the bolometer, when the voltage across the terminals of the bolometer equals the first predetermined voltage.

2. The device for detecting infrared radiation as claimed in claim 1, wherein the comparison circuitry comprises:

an operational amplifier mounted as a voltage follower with a non-inverting input of the operational amplifier connected to the bolometer;

a capacitor connected by a first terminal to the output of the operational amplifier;

a comparator connected by the non-inverting comparator input to a second terminal of the capacitor, with the output of the comparator controlling the opening and the closing of the first controllable switch and the inverting input of the comparator receiving the first predetermined voltage;

a second controllable switch connected between the second terminal of the capacitor and a second predetermined voltage; and wherein the device comprises timer circuitry for closing the first and second controllable switches.

3. The device for detecting infrared radiation as claimed in claim 2, wherein the first and second predetermined voltages satisfy the equation:

$$V_{ref}(i,j) = V_{clamp} - Iref \cdot \Delta R_0(i,j)$$

where $V_{ref}(i, j)$ is the first voltage, $V_{clamp}$ is the second voltage, Iref is the constant current output by the current source and $\Delta R_0(i, j)$ is the predetermined quantity that depends on the offset of the bolometer.

* * * * *